J. B. SWEENEY.
SPRING STRUCTURE.
APPLICATION FILED FEB. 18, 1913.
1,125,891. Patented Jan. 19, 1915.
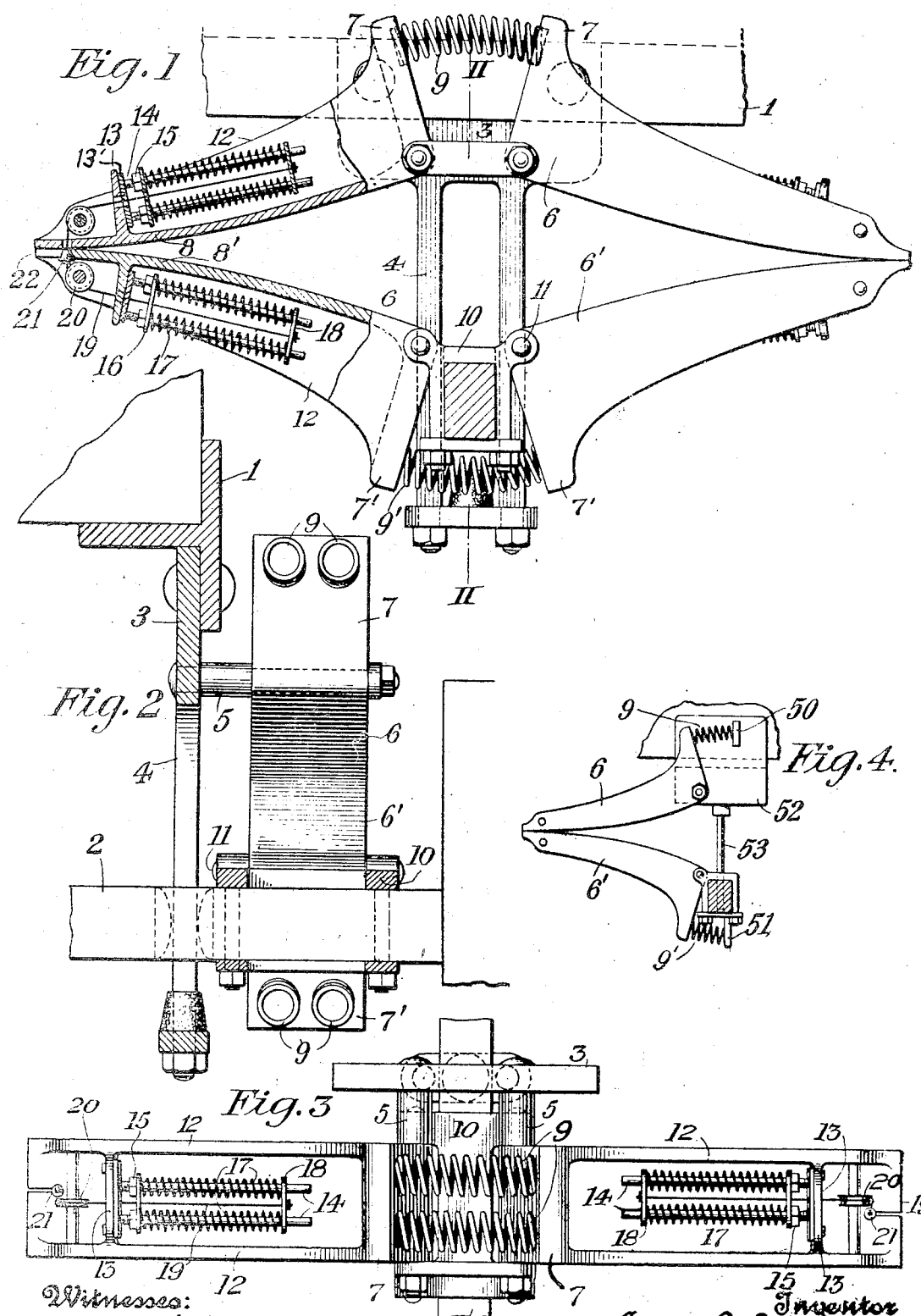

UNITED STATES PATENT OFFICE.

JAMES B. SWEENEY, OF NEW YORK, N. Y.

SPRING STRUCTURE.

1,125,891.  Specification of Letters Patent.  Patented Jan. 19, 1915.

Application filed February 18, 1913. Serial No. 749,237.

*To all whom it may concern:*

Be it known that I, JAMES B. SWEENEY, citizen of the United States, and resident of New York, in the county of New York and State of New York, have invented certain new and useful Improvements in Spring Structures, of which the following is a specification.

This invention relates to improvements in spring structures for resiliently supporting or connecting movable parts such for example as the body and axle of an automobile or other vehicle and has for one of its objects to provide a spring structure in which the resiliency of the spring automatically adjusts itself to the load to be carried without possibility of exceeding the strength of the spring however great the load.

A further object of the invention is to provide a spring structure having a plurality of springs so arranged that under normal conditions of operation a portion only of the springs is affected but when encountering unusual conditions as for instance a large rock or hole in the road other springs come into play and absorb the excessive shock whereby lighter springs may be used for carrying the normal load than is possible in spring constructions now in use and a very resilient and easy riding effect is obtained.

A further object of the invention is to provide a spring structure in which the resistance offered by the springs gradually increases as the axle and body of the vehicle approach each other without increasing the breaking strain on the springs so that however great the shock may be it will be smoothly absorbed without danger of injury to the spring structure.

A further object of my invention is to provide a spring structure in which the reaction from the compression of the springs is dissipated without shock or vibration so that the vehicle has no tendency to repeatedly bounce up and down after running over an obstruction as is now the case with the elliptical spring in use at the present time thereby obviating the use of the so-called "shock absorbers" which have come to be regarded as a necessary adjunct to the elliptical spring.

A further object of the invention is to provide a structure of the class described which is of simple construction and without complicated parts, which may be cheaply manufactured and which is efficient and durable in operation.

With the above objects in view the invention consists of the construction illustrated in the accompanying drawings and hereinafter described but it is to be understood the mechanism disclosed is shown by way of example only, that the invention is not limited to the details of the same but covers all such modification of the same as falls within the scope of the appended claims.

In the said drawings: Figure 1. shows in side elevation, partly in section, one form of the improved spring structure. Fig. 2. is a sectional view on line II—II of Fig. 1. Fig. 3 is a plan view of the structure shown in Fig. 1. Fig. 4 is a view similar to Fig. 1 but on a smaller scale of a modified form of spring.

Referring now to the drawings and particularly to Figs. 1, 2, and 3, 1 indicates a portion of the frame of a motor vehicle and 2, the axle thereof. Attached to the frame and depending therefrom is a plate 3 having its lower portion bifurcated to provide a fork 4 for slidingly engaging the axle 2 and maintaining the parts in alinement while permitting relative vertical movement. Two studs 5 are set in the face of the plate 3 at the head of the fork and pivoted on the studs are two bell-crank arms or levers 6, the studs passing through bearings adjacent the elbows of the levers. The projecting ends of the studs are preferably connected by a cross-piece to form a more substantial structure.

The levers 6 each comprise a short upwardly projecting arm 7 and a substantially horizontal arm 8 the two arms of each lever being further connected by side webs or flanges 12 forming a unitary rigid piece capable of withstanding severe strains without deformation. Mounted between the ends of the vertical arms 7 of the levers in suitable sockets are two spiral compression springs 9 which tend to force the arms 7 away from each other and consequently depress the ends of the horizontal arms 8. For supporting the ends of the arms 8 I provide two levers 6' similar to the levers 6 but inverted in position and supported on the axle 2. The levers 6' are preferably connected to the axle by means of a clip 10 which is clamped on the axle beneath the studs 5 and is provided at each upper corner with ears for receiving the pins 11 on which the levers 6' are pivoted. The levers 6' have depending arms 7' similar to the arms 7 of the levers 6 and seated between these arms are spiral springs 9' adapted to force the arms 7' apart and lift the ends of the arms 8' into contact with the ends of the arms 8 of the levers 6. The lower faces of the arms 8 and the upper faces of the arms 8' are curved after the manner of a rocker and are machined smooth to rock one on the other when the body and axle of the vehicle move relatively to each other as will be later described.

Across the pockets formed by the flanges 12 of each lever, near the outer ends thereof a cross web 13 is formed against which is detachably seated a plate 13' in each of which are set four rods 14 having their adjacent ends threaded as shown and each provided with an adjusting nut 15, the four nuts forming a seat for a plate 16. Spiral compression springs 17 are mounted on each of the rods 14 and slidingly mounted on the rods and engaging the outer ends of the springs is a plate 18' to which is attached at its middle point a small steel cable 19 which projects through a hole in the plates 16 and 13' and passes over a pulley 20 at the ends of the arms 8 or 8'. The end of the cable passes thence through a hole in the end of arm beyond the pulley and is connected to the end of the engaging arm 8 or 8' by means of a button 21 on the end of the cable and engaging the face of the arm on either side of a slot 22, whereby the cable may be readily detached. The cable of the springs of each arm 8 is connected in this manner to the engaging arm 8' and the cable of each arm 8' is connected to the arm 8, the pulleys 20 of the two arms being slightly staggered laterally of each other to permit the cables to pass without interference.

The operation of this form of the device will now be described.

In designing the structure for any given car springs 9 and 9' are of a strength to support the weight of the body of the car without being compressed sufficiently to materially separate the ends of the arms, 8 and 8' and the springs 17 are of any desired strength depending chiefly upon the extent of movement which it is desired that the body shall have. Now suppose the vehicle to be under load and traveling over a comparatively smooth road way. The springs 9 and 9' will take up substantially all the vibrations of the vehicle for the engaging surfaces of the arms 8 and 8' are so curved that the frame and axle may have a moderate relative movement without spreading the ends of the arms 8 and 8', for instance the curve may be "flatter" at the ends of the arms than nearer the pivot. Should the vehicle strike rougher roads, or an unusually large obstruction the point of contact between the arms 8 and 8' will move toward the pivots thereby spreading the ends of the arms and adding the resistance of the springs 17 to the springs 9 and 9', at the same time the shifting of the point of contact of the two arms causes the effective leverage of both the springs 9 and 9' and the springs 17 to increase as the frame and axle approach each other. That is, for the same amount of relative movement of the parts 1 and 2 when they are near together the springs will be compressed to a greater extent than when the parts are farther apart. This will be obvious from an inspection of Fig. 1. The effective leverage of the springs 9 and 9' is determined by the ratio of the fixed arms 7 and 7' to the variable arm between the point of the contact and pivots of the levers, while the effective leverage of the springs 17 is dependent upon the ratio of the portions of the arms on opposite sides of the varying point of contact. As the point of contact gets close to the pivots the effective leverage of the springs is such that a very small relative movement of the parts 1 and 2 effects a large compression of the springs which therefore offer a much greater resistance to the movement although the springs themselves are quite elastic. Furthermore the increase in resistance is not by sudden steps but is progressive so that whatever the shock, it will be smoothly absorbed by an ever increasing resistance. It will also be obvious that the degree of change may be varied to suit the conditions to be met by varying the curve of the surfaces 8 and 8'. On the re-active movement of the parts the action of the springs is just the reverse. As the parts first tend to move apart the expansion of the springs is large for a small movement of the parts but as the parts move farther apart the power of the springs gets relatively weaker and weaker so that when the frame and axle reach their normal degree of separation the velocity of their movement will have so decreased that there will be no tendency of the parts to move beyond their normal positions and vibrate back and forth as is the case with ordinary springs. It will be noted also that the springs dissipate their energy in directions at right angles to the direction of relative movement of the parts and therefore the momentum of the parts of the structure is not added to the re-active force of the springs.

It is not necessary for the device to be constructed as shown in Fig. 1 to obtain a progressively varying spring action. For instance the springs 17 may be dispensed with and the springs 9 and 9' alone used, or the springs 9 and 9' may be omitted and only the springs 14 employed.

The structure may also be modified by employing a different number or arrangement of the levers 6 and 6' as shown in Fig. 4. In the form shown in Fig. 4, I use one lever 6 with its coöperating lever 6'. The springs 9 and 9' here abut against fixed projections 50 and 51 on the bracket 52 and axle respectively and the parts being held in alinement by a pin 53 working in a hole in the axle. The operation of this mechanism will be readily understood from the description of the preferred form.

While I have described my improved spring structure in connection with motor vehicles it will of course be understood that its use is not limited to such but that it may be used wherever a spring for absorbing shock or vibration or to provide an elastic connection is desired. For instance they may be used with equal advantage as supporting springs or as the draw bar springs for railway cars or locomotive. It is particularly adaptable for buffer springs of all kinds by reason of its progressive action as will be understood. For recoil springs on ordnance or other fire arms it is also particularly effective.

It is to be understood also that the design may be modified in various ways other than that described. One such modification which may be suggested is the arrangement of several sets of devices with springs of varying stiffness in series so as to come successively into action when used, for instance, as a buffer for elevators or cars.

Having thus described my invention, what I claim and desire to secure by Letters Patent is:

1. In a spring structure, the combination of two members to be resiliently connected, a lever pivotally mounted on each of said members, means for guiding said members to maintain the pivotal points of said levers opposite to each other and in line with the direction of the relative movement of said members, said levers having curved faces of identical curvature working against each other when said members move together or apart, resilient means operatively connected to said levers for resisting equally the pivotal movement of said levers, caused by the movement of said members toward each other.

2. In a device of the class described, the combination of two relatively movable members, a bellcrank lever pivoted to each of said members with their pivotal points substantially opposite, each of said levers having one arm curved and engaging the adjacent face of the curved arm of the other lever, springs engaging the other arms of said bellcrank levers for resisting their pivotal movement, and a supplemental spring connected to the free ends of said curved arms to be stressed by the separation of said arms.

3. In a spring structure, the combination of two members to be resiliently connected, a lever pivotally mounted on each of said members, said levers having curved faces working against each other when said members move together or apart, and a spring operatably connected to the ends of both of said levers to resist the separation of the ends of the levers as their point of contact moves toward the opposite ends of said levers.

4. In a spring structure, the combination of two members to be resiliently connected, a rocking lever connected to each of said members with their points of connection in the line of movement of said members toward and from each other, each of said levers having a similar convex face working against the convex face of the opposite lever, and a spring operatably connected to the free ends of both of said levers to resiliently hold the ends of said levers against separation.

5. In a spring structure, the combination of two members resiliently connected, a pair of levers connected to each member with their points of connection adjacent and their free ends extending in opposite direction from such points, each lever having a convex face working against the convex face of the corresponding lever of the other member, and springs operatably connected to the free ends of the adjacent levers to resiliently resist the separation of such ends as the points of contact of said levers move toward their points of connection upon the relative movement of said members.

6. In a spring structure, the combination of two members to be resiliently connected, a rocking bellcrank lever pivoted to each of said members with their pivotal points opposite, each of said levers having a curved arm working against the convex face of the curved arm of the other lever, a spring connected with the other arm of each lever to resiliently hold the contacting arms of the levers together, and a spring operatively connected with the free ends of the contacting arms of both said levers to resiliently hold the ends of said levers against separation.

Signed at New York in the county of New York and State of New York this 14th day of Feb'y A. D. 1913.

JAMES B. SWEENEY.

Witnesses:
W. B. MORTON,
L. E. JOHNSTON.